INVENTORS
W. R. SMITH
G. O. FERM
V. P. KOVALCIK

THEIR AGENT

PERFORMANCE CODE TRANSMITTED FROM CENTRAL OFFICE

| PERFORMANCE LEVEL | CODE | |
|---|---|---|
| MAXIMUM | 0 | 0 |
| NORMAL | 1 | 0 |
| REDUCED | 0 | 1 |
| RETARDED | 1 | 1 |

FIG. 2

PERFORMANCE CODE TRANSMITTED FROM WAYSIDE

| SPEED | CODE | | | |
|---|---|---|---|---|
| MAX. | 0 | 0 | 0 | * |
| 68 | 1 | 0 | 0 | * |
| 60 | 0 | 1 | 0 | * |
| 52 | 1 | 1 | 0 | * |
| 44 | 0 | 0 | 1 | * |
| 36 | 1 | 0 | 1 | * |
| 28 | 0 | 1 | 1 | * |
| 20 | 1 | 1 | 1 | * |

\* 1 OR 0 SELECTED TO DESIGNATE RETARDED OR NOT RETARDED ACCELERATION.

FIG. 3

INVENTORS
W. R. SMITH
G. O. FERM
V. P. KOVALCIK

BY

THEIR AGENT

United States Patent Office 3,538,325
Patented Nov. 3, 1970

3,538,325
PERFORMANCE LEVEL CONTROL OF VEHICLES
FROM A CENTRAL OFFICE
Willis R. Smith, Vincent P. Kovalcik, and Glenn O. Ferm,
Rochester, N.Y., assignors to General Signal Corporation, Rochester, N.Y., a corporation of New York
Filed May 16, 1968, Ser. No. 729,603
Int. Cl. B60l 21/10
U.S. Cl. 246—63                                    5 Claims

ABSTRACT OF THE DISCLOSURE

A system is provided for code communication of performance level controls from a central office to a plurality of remotely spaced stations along a right of way such as would be provided for rapid transit vehicles. The stations all receive the same codes from the central office, and storage means is provided at each station for storing the performance level last communicated to that station. In accordance with this storage at each station, desired tion of such vehicles between stations. The codes transmitted to vehicles in the area adjoining that station to govern both the speed and rate of acceleration for operation of such vehicles between Stations. The codes transmitted to the vehicles from the several stations for a given performance level designated at the central office can vary relative to each other because of different distances between stations within which it is desired to make time of vehicle operation performance adjustments.

---

While the invention is subject to a wide range of applications, it is especially suited for use in an automatic vehicle control system and will be particularly described in that connection. It more particularly pertains to a system using code communication apparatus for the control of performance levels for operating vehicles along a right of way, the performance levels being selected at a central office.

This invention is in the nature of an improvement in the automatic vehicle control system disclosed in the Hughson et al. Pat. No. 3,363,096, granted Jan. 9, 1968. According to that patent, a reference acceleration rate signal can be manually selected on each vehicle for use in governing the automatic operation of the vehicle. To have the level of acceleration changed from station to station as may be required to obtain desired performance levels, would require an operator on each vehicle. This is undesirable when the primary objective of an automatic vehicle control system is to provide fully automatic vehicle operation.

An object of the present invention is to provide performance level control of vehicles from a central office which obviates the necessity of manual selection of a rate of acceleration on the vehicles as has been described as being required in the prior arrangements.

Another object of the present invention is to provide performance level control of vehicles from a central office wherein performance codes are communication from the central office to a plurality of spaced stations where they in turn can select different codes for communication from the wayside to the vehicles characteristic of desired speed and acceleration.

SUMMARY OF THE INVENTION

The present invention provides a system for performance level control of vehicles from a central office as they progress along a right of way extending past a plurality of spaced stations wherein codes characteristic of selected performance levels are communicated from the central office to all of the field stations. Each of the field stations has storage means for storing the performance codes involved. Transmitting means at each station communicates a performance level code governed by this storage that is indicative of desired speed and acceleration rates for vehicles in the vicinity of the associated station. Vehicle carried apparatus is governed by the reference speed and reference acceleration codes received for operating the vehicle in a manner to conform to the performance levels communicated by code from the central office.

For a better understanding of the present invention, together with other further objects thereof, reference is had to the following description, taken in connection with the accompanying drawing, while its scope will be pointed out in the appending claims.

FIG. 2 is a code chart showing performance codes selectively transmitted from the central office to the several field stations.

FIG. 3 shows a code chart of performance codes transmitted from the wayside to the vehicles in the vicinity of the associated station.

Figure 1:
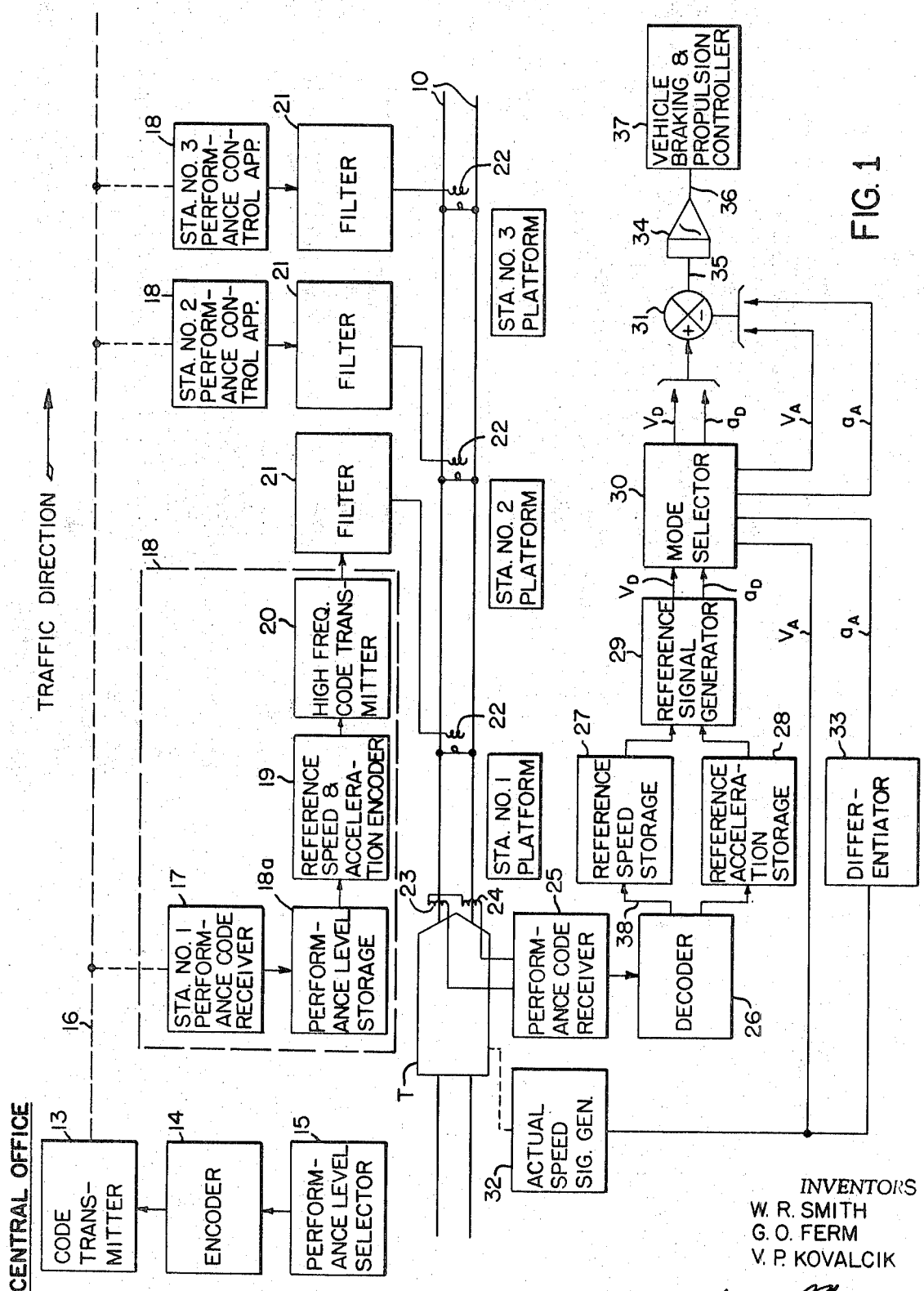
FIG. 1 illustrates schematically a system according to a preferred embodiment of the present invention for the performance level control of vehicles along a right of way from a central office.

With reference to FIG. 1, in illustrating a preferred embodiment of the present invention, a portion of a right of way 10 is shown as passing typical spaced passenger platforms. These include, successively in the direction of traffic, station No. 1 platform, station No. 2 platform, and station No. 3 platform. The direction of traffic is assumed to be from left to right.

A code communication system is provided connecting the central office with stations adjoining the station platform along the right of way. Such a code communication system comprises a code transmitter 13 at the central office together with an encoder 14 and a performance level selector 15. The code transmitter 13 is connected over a suitable communication channel 16 with the respective stations including station No. 2 performance code receiver 17, and station No. 3 performance control apparatus 18. It is to be understood that the apparatus associated with station No. 2 performance code receiver 17 is typical of the apparatus provided at each of the other stations along the right of way. This apparatus comprises a performance level storage 18a for storing the code received over the communication channel 16 from the central office. All stations have their performance level storages conditioned the same in response to whatever performance level code may be transmitted by the code transmitter 13 at the central office.

Transmitting means is provided at each of the stations which is controlled by the performance level storage 18 at the associated station for transmission to the vehicle in the adjoining area of a code selected at that station characteristics of both reference speed and reference acceleration. Thus a reference speed and acceleration encoder 19 is provided for selecting performance codes for transmission by a high frequency code transmitter 20 which has its output connected to the track rails through a suitable filter 21 and through a transformer 22.

Vehicle carried apparatus comprises code receiver coils 23 and 24 disposed on the front of the vehicle for receiving energy transmitted toward the front end of the train through the track rails. The code received in the track rails in advance of the vehicle by the receiver coils 23 and 24 is applied to a performance code receiver 25 which delivers an output to a suitable decoder 26 for decoding the performance information that is communicated from the wayside. According to this decoding operation, an output is provided from the decoder 26 to a reference speed storage 27, and similarly an output is provided from the decoder 26 to a reference acceleration storage 28. In accordance with the codes stored by the storages 27 and 28, continuous reference signals are generated by a suitable reference signal generator 29 and applied through a mode selector 30 to a deviation detector 31 for comparison with continuous actual speed and acceleration signals. These actual speed and acceleration signals are obtained from a signal generator 32 which is driven by an axle of the vehicle. The actual acceleration signal is obtained from the actual velocity signal by a differentiator 33. In accordance with comparing reference and actual speed signals in the deviation detector 31, an error signal output is delivered to an integrator 34 over wire 35, and the output of integrator 34 is applied over wire 36 to vehicle braking and propulsion controller 37 to govern the operation of the vehicle. A similar comparison is made at times between the signals for reference and actual acceleration.

To consider the mode of operation of the system, reference will first be made to the code chart of FIG. 2 wherein four different performance levels are identified by distinctive two-bit binary codes. The maximum performance level can be considered as the passage of the maximum number of vehicles past a particular station per unit of time. The normal, reduced and retarded performance levels are selected to pass progressively lower numbers of vehicles respectively past the particular station during the same unit of time. In other words, performance as used in this application can be considered as the time spacing between vehicles, the lowest performance level being the longest time interval between the arrival of successive vehicles at a given point along the right of way.

The performance level selector 15 (see FIG. 1) is actuated at the central office to select one of the four levels in the code table of FIG. 2 to have its code generated by encoder 14 for transmission to the field stations over communication channel 16 by code transmitter 13. This selection can be made manually, or it can be made automatically, as by a computer, in accordance with the requirements of practice. The central office apparatus shown in the W. D. Hailes et al. Pat. No. 2,399,734 is typical of the many code communication systems which may be used to transmit the performance level. The transmission of a code selected by code transmitter 13 sets the performance level storages 18a at all of the stations to the same performance level that has been selected by the performance level selector 15 at the central office.

More specifically, if the performance codes, such as are shown in FIG. 2, are to be communicated from the control office to the several wayside stations over a communication system such as is shown in the Hailes patent, the codes can be selected according to the code chart of FIG. 6 of that patent. This patent uses a long pulse followed by a short pulse as one code character such as a "1" in the code chart of FIG. 2 of this application and a short pulse followed by a long pulse for the other binary character such as "0" in the code chart of FIG. 2. It is not necessary that station codes be used because the same code is received at all stations in the present application. Thus a control lever such as lever 3SML of FIG. 2A can be used to select the first two performance codes of the performance code chart of FIG. 2 of this application for transmission, and a similar lever can be used to select the other two codes.

The receiving apparatus 17 of the present application can be provided according to FIG. 4 of the Hailes patent, and the code received can be stored in storage 18a of the present application by apparatus such as relays WN and WR in FIG. 5 of Hailes. These relays have stick circuits to maintain them energized until a different code is received.

If the station platforms along the right of way were all evenly spaced, the vehicles could be controlled directly by the performance codes transmitted from the central office, but this is not the condition encountered in practice. The station platforms are generally unevenly spaced, and thus to adjust for a change in performance requires different changes to be made at different stations in accordance with the spacing between station platforms. For example, for a short distance between stations, a vehicle may not reach its desired speed much before it is necessary to start to decelerate in order to stop at the next station. Under such conditions, in order to increase the time of arrival of successive vehicles at a station platform, it is necessary to alter both the desired maximum speed and the desired rate of acceleration in order to be able to fully absorb the amount of additional time required for a newly designated lower performance level in a short distance between stations.

It is therefore important that the performance level code received at each station from the central office over the communication channel 16 be converted to a different code which takes into account the distance to that station from the next preceding station. This is done by the selection at each station of a performance code for transmission from the wayside to vehicles at the associated station by the reference speed and acceleration encoder 19. This encoder 19 is controlled by the performance level storage 18a at the associated station to select one of the codes of the table in FIG. 3. The codes according to the table in FIG. 3 designates different reference speed, and the fourth element of the code is indicated to be selected to be a 1 or a 0 in accordance with the designation of one reference rate of acceleration or another. Because of the differences in the distances between stations, a different code is selected at many of the stations for the same given performance level stored in the associated performance level storage 18a. The performance levels selected are of course subject to revision downwardly if a low speed has been selected by a safety system (not shown) comparable to the system disclosed in the Hughson et al. Pat. No. 3,363,096.

To consider the mode of operation of the transmitting means at each of the stations it will be assumed that a normal performance level is stored by the performance level storages 18a at each station. Because of this performance level being less than maximum level, the storage 18a at station No. 1 must select a code from the code table of FIG. 3 to provide the desired amount of additional headway between vehicles arriving at station No. 2 as compared to maximum headway as is called for by this normal level of performance. If the distance between station No. 1 and station No. 2 is relatively long, only a relatively small reduction in the reference speed would be necessary to provide for the normal performance level that is assumed to have been designated. Furthermore, it would not be necessary to use a lower reference rate of acceleration. Thus the code 1-0-0-0 (see FIG. 3) could be selected by the encoder 19 for transmission to a vehicle at station No. 1. This code would call for a reference speed 68 miles per hour and a normal rate of acceleration. This code is communicated by the high frequency transmitter 20 through the filter 21, transformer 22, track rails and receiver coils 23 and 24 to performance code receiver 25 on the vehicle T. Transmission of such codes to the vehicle may be accomplished as described in the specification of the C. L. Wilcox Pat. No. 3,284,627. With reference to FIG. 1A of the Wilcox patent, there is provided means for generating various tones, coding and modulating the tones, and transmitting the coded information to the track rails for control of the vehicle. The code received in the present system is decoded by the decoder 26. The decoder 26 provides an output over line 38 to reference speed storage 27 to register a desired reference speed of 68 miles per hour as indicated by the code 1-0-0-0 that has been transmitted from the wayside to the vehicle T. In accordance with such storage in reference speed storage 27, a continuous reference signal is generated by reference signal generator 29 at a level comparable to the desired reference speed, and is applied over line $V_D$ to mode selector 30. The reference signal generator 29 also generates continuously a reference acceleration signal at a level comparable to the desired reference acceleration which is applied over line $a_D$ to mode selector 30. This acceleration reference signal is determined by the reference acceleration storage 28, and for the code that is being considered as being received from the wayside by the vehicle T at this time, the acceleration rate is normal (not retarded).

The reference speed and acceleration encoder 19 of the present apparatus can contain encoding apparatus such as is shown at the top of FIG. 7 of the Wilcox patent. The code selecting relays CR can be the storage relays of storage 18a. These relays select distinctive combinations of tones to be applied to modulator 7–MOD. The high frequency code transmitter 20 of the present application can be the same as transmitter 7–TX of FIG. 7 of the Wilcox patent. The codes can be received and decoded on the train by train carried apparatus shown in FIG. 7 of the Wilcox patent wherein relays XR1, XR2, XR3 and XR4 are distinctively responsive to the four different tones that can be transmitted. These relays are maintained steadily energized to store the code because the transmission is continuous.

The function of the mode selector 30 is to select reference acceleration and actual acceleration signals for comparison in deviation detector 31 or reference speed and actual speed signals for comparison. One manner in which this selection can be made is fully disclosed in the above-mentioned Hughson et al. Pat. No. 3,363,096. This patent also discloses how the error signal applied on line 35 can be used to control the vehicle through an integrator corresponding to integrator 34 and through a closed loop control circuit. If the closed loop circuit is used, a converter converts the voltage output of integrator 34 to current and the propulsion and braking of the vehicle is governed by the level of the current in the closed loop.

More specifically, the reference speed storage 27 of this application can be the reference signal selector 36 of FIG. 2 of the Hughson et al. patent, the details of which are shown in FIG. 4A. The code received relative to reference speed can be applied to the selections of the maximum speed selector switch 107 of FIG. 4A in the Hughson et al. patent. Also the character in the code received relative to acceleration is stored in the reference acceleration storage 28 and can be used to select points of acceleration rate selector 80 of FIG. 4A of the Hughson et al. patent. The apparatus of reference signal generator 29 and mode selector 30 can be the apparatus shown as blocks 36 and 35 respectively of the Hughson et al. patent and the deviation detector 31 of this application can have apparatus corresponding to deviation detector 32 of the Hughson et al. patent.

Having thus considered how a vehicle can be controlled in response to a normal level performance code communicated from the central office to station No. 1, another condition of operation will be considered wherein the same performance code is used at station No. 2 where there is a shorter distance between the station platform No. 2 and the station platform No. 3. At station No. 2, the performance speed and acceleration encoder (not shown) corresponding to encoder 19 at station No. 1 is conditioned to select a reference speed and reference acceleration code that will provide the same amount of headway between successive vehicles arriving at station No. 3 as is provided for vehicles arriving at station No. 2. This is accomplished by selecting a lower reference speed and a lower reference acceleration rate code for transmission from station No. 2 than is selected for transmission from station No. 1 for vehicles approaching that station. Such a code could be, for example, the code 1-1-0-1 of the code table in FIG. 3, which calls for a reference speed of 52 miles per hour and for a retarder rate of acceleration. This code is communicated by apparatus comparable to that which has been described relative to transmission from the wayside at station No. 1 to the vehicle T when the front of the vehicle T approaches the right hand end of station No. 2 platform.

The reception of the above-assumed code from station No. 2 on the vehicle T establishes a new reference speed in reference speed storage 27 and a new reference acceleration in reference acceleration storage 28. The vehicle T thus becomes controlled in accordance with these reference storages so that an appropriate adjustment is made for running time between station No. 2 and No. 3 in accordance with the normal performance code that is assumed to have been communicated from the central office to all stations. This system as described is particularly desirable in that it will provide a more uniform velocity between stations than a system that would follow the track speed profile reduced by a selected percentage to give a selected performance level.

While there has been described what is at present considered to be the preferred embodiment of the invention, it will be obvious to those skilled in the art that various changes and modifications may be made therein, without departing from the invention, and it is, therefore, aimed in the appending claims to cover all such changes and modifications as fall within the true spirit and scope of the invention.

What is claimed is:

1. A system for performance level control of vehicles from a central office as they progress along a right of way extending past a plurality of spaced field stations comprising,
  (a) code communication means for selectively communicating a plurality of different codes relative to different selected performance levels from the central office to all of the stations,
  (b) transmitting means at each of the stations controlled by the performance level codes for transmitting to vehicles in the adjoining area a code characteristic of both reference speed and reference acceleration, and
  (c) vehicle carried means governed by the reference speed and reference acceleration codes for operating each vehicle in a manner to conform to the performance levels communicated from the central office.

2. The invention according to claim 1 wherein the transmitting means comprises a high frequency transmitter for transmitting the reference speed and reference acceleration codes from the wayside to the vehicle via railway track rails.

3. The invention according to claim 2 wherein an output of the high frequency transmitter is applied to the track rails through a transformer and is received on a vehicle by receiver coils disposed over the track rails.

4. The invention according to claim 2 wherein the vehicle carried means comprises means for generating a signal characteristic of actual vehicle speed and a signal characteristic of actual vehicle acceleration, and means is provided for generating reference speed and acceleration signals corresponding to the reference speed and acceleration code transmitted from a station along the right of way.

5. The invention according to claim 4 wherein the vehicle carried means includes a mode selector and deviation detector means for at times comparing the reference acceleration signal with the actual acceleration signal and at other times comparing the reference speed signal with the actual speed signal.

References Cited

UNITED STATES PATENTS

| | | | |
|---|---|---|---|
| 2,399,734 | 5/1946 | Hailes et al. | 340—163 |
| 3,284,627 | 11/1966 | Wilcox | 246—187 |
| 3,363,096 | 1/1968 | Hughson | 246—187 |

ARTHUR L. LA POINT, Primary Examiner

G. H. LIBMAN, Assistant Examiner

U.S. Cl. X.R.

246—187